United States Patent

Wydra et al.

[11] Patent Number: 5,326,083
[45] Date of Patent: Jul. 5, 1994

[54] COMPRESSION SPRING WITH CONE SHAPED FRUSTUMS SUBJECT TO COMPRESSION SET

[75] Inventors: Neal E. Wydra, Glen Ellyn; David W. Geick, North Aurora, both of Ill.

[73] Assignee: Miner Enterprises, Inc., Geneva, Ill.

[21] Appl. No.: 32,698

[22] Filed: Mar. 17, 1993

Related U.S. Application Data

[63] Continuation of Ser. No. 812,602, Dec. 23, 1991, abandoned.

[51] Int. Cl.⁵ .................... F16F 7/00; B60R 19/24
[52] U.S. Cl. .................... 267/139; 267/141.7
[58] Field of Search ............ 267/139, 140, 141.7, 267/145, 141.1, 153, 258, 292; 293/136

[56] References Cited

U.S. PATENT DOCUMENTS

| | | | |
|---|---|---|---|
| 2,144,357 | 1/1939 | Booharin | 293/136 |
| 4,198,037 | 4/1980 | Anderson | 267/153 |
| 4,258,641 | 3/1981 | Wakamiya | 293/136 X |
| 4,267,792 | 5/1981 | Kimura et al. | 267/153 X |
| 4,515,502 | 5/1985 | Kajigaya et al. | 267/140 X |
| 4,566,678 | 1/1986 | Anderson | 267/141.1 |
| 4,624,493 | 11/1986 | Hillebrand et al. | 293/136 |
| 4,721,414 | 1/1988 | Akiyama | 267/140 X |
| 4,893,857 | 1/1990 | Bobinger et al. | 293/136 |
| 4,962,916 | 10/1990 | Palinkas | 267/153 |
| 5,000,215 | 3/1991 | Phillips | 137/15 |
| 5,104,101 | 4/1992 | Anderson et al. | 267/219 |
| 5,141,697 | 8/1992 | Wydra | 264/320 |

FOREIGN PATENT DOCUMENTS 2131054 1/1973 Fed. Rep. of Germany ...... 293/136

OTHER PUBLICATIONS

Du Pont Publication, "Hytrel ®" Polyester Elastomer.

*Primary Examiner*—Robert J. Oberleitner
*Assistant Examiner*—Josie A. Ballato

[57] ABSTRACT

A compression spring formed of an elastomer having a ratio of plastic strain to elastic strain that is greater than 1.5 to 1 and formed into a spherical body having cone frustums at each end to provide for a substantially constant spring rate over a major portion of its displacement. The spring is precompressed to overcome the compression set characteristics of the elastomer and to orient its molecular structure. The spring is particularly useful as a bumper spring for an automotive vehicle.

8 Claims, 2 Drawing Sheets

COMPRESSION SPRING WITH CONE SHAPED FRUSTUMS SUBJECT TO COMPRESSION SET

This application is a continuation of application Ser. No. 07/812,602, filed Dec. 23, 1991 now abandoned.

BACKGROUND OF THE INVENTION

1. Field of Invention

This invention relates to elastomeric compression springs. The preferred embodiment of our invention is primarily directed to a compression spring for the bumper assembly of an automobile.

The automotive and insurance industries have long sought a bumper assembly that would absorb the energy of a collision at speeds of 5 miles an hour or less. The acceptability of these units is evaluated by two different criteria. The first is the "no visible damage" criteria. On belief, existing hydraulic bumper assemblies generally meet this criteria, i.e., they protect the vehicle from visible damage. The second is the "no dollar damage" criteria. On belief, the presently used hydraulic units cannot consistently meet the latter criteria. Either the bumper assembly itself or other parts of the automobile suffer functional damage from collisions at 5 mph. Moreover, such bumper assemblies are comprised of a plurality of parts that add undesirable weight, impose assembly costs, require separate, preload springs to minimize vibration, and do not provide a generally constant spring rate.

2. Related Art

Numerous efforts have been made to design a bumper spring for automobiles that would meet the industry goals and criteria. These efforts include U.S. Pat. No. 4,893,857 which issued to General Motors Corporation on an application of Bobinger, et. al. This device of General Motors includes a cylindrical tube containing a first energy absorbing medium, a preload unit comprised of a compression spring and disks and a telescoping piston tube that extends to the bumper. One energy absorbing medium described by General Motors is a thermoplastic material such as Hytrel ®, a copolymer elastomer manufactured by E.I. dupont de Nemoirs which has a very high compression set characteristic and which, in part, necessitates the preload assembly to insure that the bumper assembly returns to its original position after a collision.

Another prior effort to design a bumper spring is illustrated by U.S. Pat. No. 4,624,493 which issued to Chrysler Motors Corporation on an application of Hillebrand, et. al. Like the General Motors patent, the Chrysler patent also includes a plurality of parts, i.e., a load bearing tube member with an abutment, a reaction coil spring for preload and an energy absorbing capsule containing the Hytrel ® copolymer elastomer of E. I. dupont de Nemoirs.

Additional prior art related to the present invention is U.S. Pat. No. 4,566,678 which issued to Miner Enterprises, Inc. on an application of David G. Anderson. This patent focuses on the thermoplastic Hytrel ®. It explains a method of producing a hollow spring of Hytrel ® and of eliminating the compression set problems of this thermoplastic. While this patent effectively overcomes the compression set characteristics of Hytrel ® and provides a very effective spring for absorbing substantial energy in rail car applications, modifications are required to apply this concept to the automotive industry in order to meet the "no visible damage" and "no dollar damage" tests. A basic modification is the provision of a different force travel curve. And this, in turn, necessitates design modifications and enhancements that go beyond the teachings of this Anderson patent.

SUMMARY OF INVENTION

Our invention is a compression spring for absorbing substantial amounts of energy at a constant maximum rate over a limited displacement. It is an elongated hollow body formed of an elastomer whose ratio of plastic deformation to its elastic deformation is greater than 1.5 to 1. Preferably, the elastomer is a copolyester polymer elastomer such as that manufactured and sold by E. I. duPont de Nemoirs under the trademark Hytrel ®. In the preferred embodiment, the hollow body is designed for installation into the bumper assembly of an automobile and the material is provided with a shape and orientation that permit the unit to absorb the forces resulting from a collision without visible or dollar damage to the vehicle.

Accordingly, the objectives of this invention are to provide, inter alia, 1) a unique elastomeric compression spring shaped to provide a substantially constant spring rate capable of absorbing the collision energy of an automobile traveling at 5 mph without either visible damage or dollar damage to the vehicle;
2) a simple, one piece bumper compression spring that eliminates the costs of preload components and their assembly, and minimizes the costs of installation upon new and existing automobiles;
3) an elastomer spring formed of an elastomer that is very durable, inert to reaction with highway grime, salt and corrosive fluids, not subject to tear propagation, and that has tensile characteristics such that the ratio of plastic strain to elastic strain is greater than 1.5 to 1; and
4) an elastomeric bumper compression spring of relatively low costs and light weight for improving the Corporate Average Fuel Economy of the automobile manufacturers.

DESCRIPTION OF THE DRAWINGS

The manner in which these objectives and other desirable characteristics can be obtained from our invention is explained in the following specification and attached drawings in which.

DESCRIPTION OF THE PREFERRED EMBODIMENT

Figure 1:
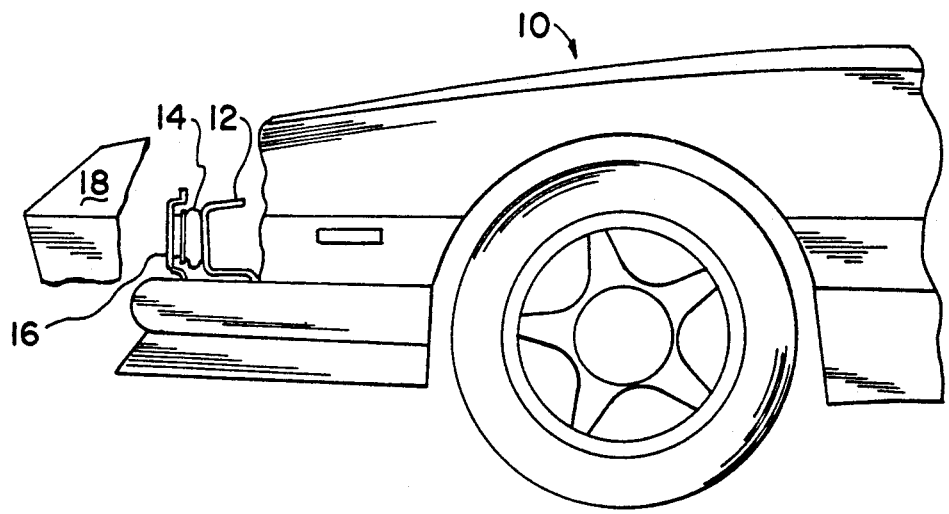
FIG. 1 is an illustrative side elevation view of an automobile with portions broken away to depict our invention and its application to the bumper assembly of an automobile.

The preferred embodiment of our invention is illustrated in one intended environment in FIG. 1 in which the front of an automobile is depicted at 10. Two laterally spaced and similar supports 12 extend from and are rigidly attached to the frame of the automobile (not shown). One end of our compression springs 14 are affixed each of these supports and extend forward to be affixed to and support the bumper 16. Over this bumper 16 is mounted a plastic facia 18 which is designed to provide an attractive appearance to the automobile 10.

Figures 4, 5, 6:
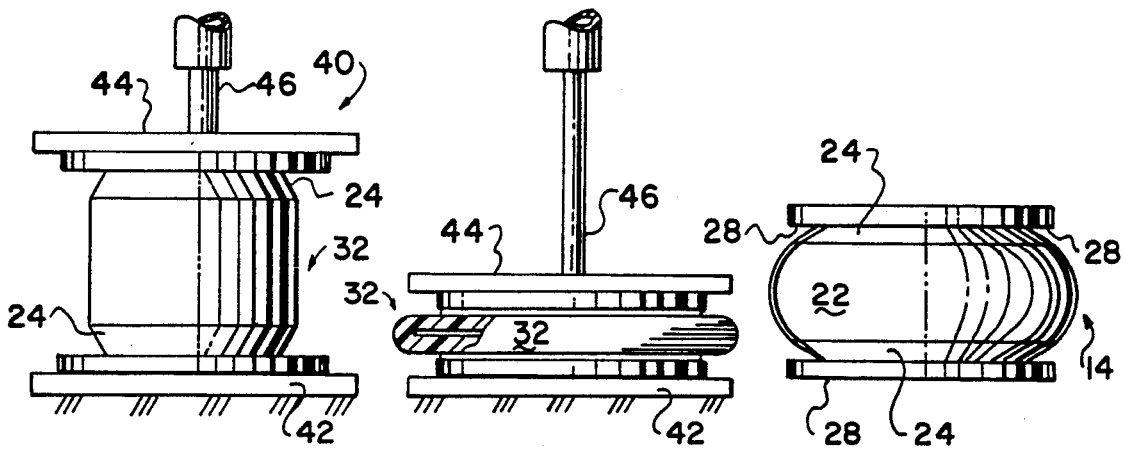
FIG. 4 is a side elevation view of a preferred embodiment of a preform disclosing the apparatus for used to precompress and orient the preform to obtain the preferred embodiment of our invention.
FIG. 5 is a side elevation view of a preferred embodiment of a preform disclosing the compression step in the manufacture of a preferred embodiment of our invention.
FIG. 6 is a side elevation view of a preferred embodiment of our invention.

The shape and configuration of the preferred embodiment of our compression spring 14 is illustrated in FIG. 6. It comprises a central spherical segment 22 whose ends integrally join cone shaped frustums 24 having an acute angle which is generally tangent to the ends of the spherical segment. The frustums 24 terminate in flanges 26 which have apertures 28 for receiving bolts (not shown) or other means for attaching the spring 14 to the vehicle and to the bumper.

When made according to the process described below, this compression spring provides a force-displacement curve similar to that illustrated in FIG. 7. The vertical axis on which the curve is plotted represents the force of a collision in thousands of pounds. The horizontal axis represents the bumper displacement in inches resulting from a collision at speeds up to 5 mph. As shown, the force upon collision is limited to some 7,000 pounds (14,000 pounds for two springs) by the spring rate of the spring and the displacement of the bumper 16. Moreover, the force quickly increases towards this maximum rate and remains substantially constant over a substantial portion of the displacement of the bumper. By limiting this maximum spring rate and by providing sufficient displacement of the spring which will absorb the collision energy, visual and dollar damage to the vehicle is avoided. Moreover, the simplicity of our one piece compression spring design and the use of an elastomer that is resistant to tear propagation avoids damage to the bumper spring itself.

Figure 7:
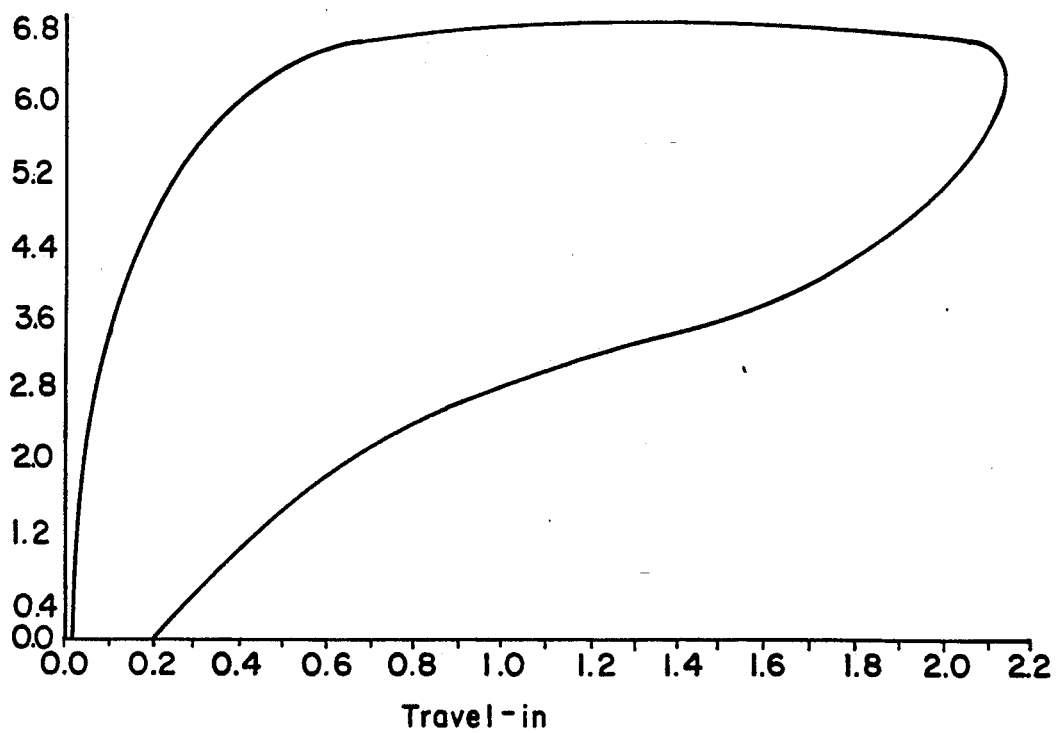
FIG. 7 is an illustrative displacement graph depicting the force-displacement curve of our compression spring.

On belief, the configuration of our spring enables our invention to obtain the desirable spring rate of the curve of FIG. 7. Important to this configuration is the cone frustum 24 which is believed to serve as a transition segment permitting the spring to maintain the maximum desired force for a greater percentage of its available deflection. Such differs from the Anderson patent (mentioned above) in which a straight cylindrical body is compressed to form a generally spherical compression spring. The spring of that patent permits the applied force to continually rise to a peak. An increasing, rather than a constant, incremental force is absorbed with each increment of spring displacement. As a result, the teachings of the Anderson patent and similar teachings would permit the force applied to exceed the maximum and result in visual or dollar damage to the automobile.

Figure 2:
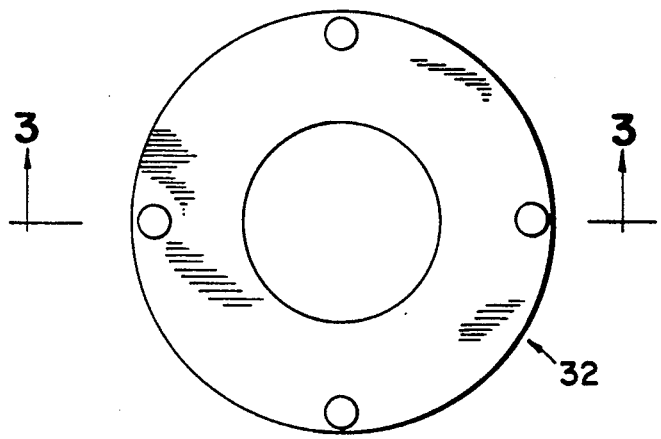
FIG. 2 is a plan view of a perform used in the manufacture of the preferred embodiment of our invention.
Figure 3:
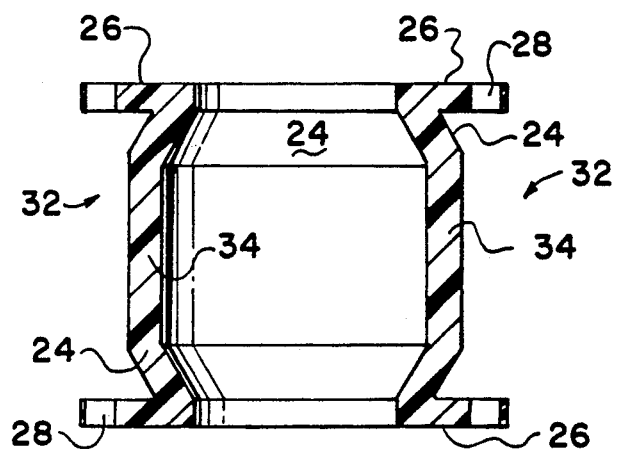
FIG. 3 is a sectional side elevation view of a preform used in the manufacture of the preferred embodiment, the view being taken along the lines 3—3 of FIG. 2.

Manufacture of our invention begins with the molding of the integral preform unit 32 depicted in FIGS. 2 and 3. This preform takes the shape of a hollow cylindrical body 34 having a cone shaped frustums 24 joined to each end of the cylinder. Joined to these frustums 24 are flanges 26 which serve as means for attachment of the spring to the chassis and to the bumper. Apertures 28 in these flanges or other affixing devices may be used to affix the spring to the chassis and to the bumper.

This preform, according to our invention, is formed of an elastomer having tensile characteristics such that the ratio of plastic strain to elastic strain is greater than 1.5 to 1. One such elastomer is a copolyester polymer elastomer manufactured and sold by E.I. du Pont de Nemoirs under the trademark Hytrel ®. It is reasonably inert and significantly, it is quite durable. Moreover, this elastomer is not subject to tearing or to crack propagation even when made in relatively thin cross sections. We prefer to use du Pont's Hytrel ® composition no. 5556. (For a more complete description of this elastomer, see Anderson U.S. Pat. No. 4,198,037 and the references cited therein). Normally, the selected elastomer is purchased in pellet form, and, according to our invention, is injected or extruded into a mold to form the preform 32. Various plastic molding techniques such as melt casting, injection molding, rotational molding, etc. may be used to make this preform.

The preform 32 is not, without additional manufacturing steps, adequate to serve as a compression spring. This is primarily due to the fact that Hytrel ® and similar elastomers take a compression set—and upon the first compression, will not return to their original length. In addition, orientation of the molecular structure of the elastomer is needed to provide the desirable spring characteristics. This inadequacy of such elastomers are demonstrated by the General Motors and Chrysler Corporation patents referenced above. Each calls for additional preload devices that are normally essential to overcome the compression set characteristic of the elastomer.

The additional manufacturing step needed to overcome this compression set characteristic of Hytrel ® includes precompression and orientation of the molecular structure. Orientation of the molecular structure may be accomplished by plastic deformation of the preform in at least one direction in the manner depicted in FIGS. 4 and 5.

These figures include a precompression press 40 which has a bottom fixed plate 42, a top movable plate 44, and a rod 46 that is vertically reciprocated by hydraulic or mechanical means. In the manufacture of our invention, the preform 32 is inserted into this press as depicted in FIG. 4 and, it is compressed by at least 30 percent of its length in at least one direction, i.e., axially as shown in FIGS. 5 and 6. Preferably, it is fully compressed as illustrated in FIG. 5 by reciprocating the plate 44 downward until the entire unit is pressed flat. When the downward force of rod 46 is removed and the plate 44 is raised, the compression spring of our invention partially recovers to its original height and takes a new shape as shown in the preferred embodiment depicted FIG. 6. As depicted, the transition section or cone shaped frustums 24, after compression and orientation, form a more acute angle with the flanges 26, and the cylindrical section 34 has been reshaped into a spherical section 22.

After the precompression step and partial recovery of the preform, our compression spring is free of the compression set problem and, upon subsequent compressions, the spring will return or spring back to the height reflected in FIG. 6. In part, the "spring back" characteristics, as well as the spring rate characteristics of our invention are the result of orientation of the molecules of the Hytrel ® that resulted from the precompression step of FIGS. 4 and 5.

In as much as various models of automobiles have different weights and different desired ride characteristics, there is no one manufacturing design for our invention which will accommodate all vehicle models and some experimentation for each potential application will be required. Nevertheless, a primary, important design element necessary to obtain the desired constant spring rate curve is the transition section or cone shaped frustums 24 which, upon the precompression step, form a more acute angle with the flanges 26 and which are oriented to provided the desired spring effects. In designing a compression spring according to our invention for a new application, the preferred, direct procedure is to make two or more springs, correlate their dimensions to their resulting spring rate and then interpolate or modify the dimensions until the desired spring rate is obtained.

Persons skilled in the art of plastic forming and compression spring design will discover that many modifications of our invention will produce satisfactory results. Elastomers other than Hytrel ® may be acceptable for some applications. With respect to the shape, only one transition section 24, may be used adjacent one of the flanges 26. Moreover, it may take various shapes. Similarly, the angle of the transition section with respect to the flanges 26 and the spherical sections 22 might be reversed.

The process of molding the compression spring of our invention can also include various modifications. Extrusion blow molding would yield acceptable springs. These and other variations, which will be appreciated by those skilled in the art, are within the intended scope of our invention as claimed below.

We claim:

1. A compression spring adapted to absorb collision energy and to be compressively displaced in response to a collision between two masses at a substantially constant spring rate over a major portion of its displacement, said spring comprising:
    a) a hollow spring member formed of an elastomer having a molecular structure and having a ratio of plastic strain to elastic strain that is greater than 1.5 to 1, the molecular structure of said member being oriented in at least one direction;
    b) said spring member having a spherical segment whose ends terminate in a transition means, said transition means comprising an integral extension of said spherical segment extending at an angle from the spherical segment;
    c) said spring having means for interconnection between two members for absorbing energy; and
    d) the material of said spherical segment, transition means and the angle being oriented to provide a relatively constant spring rate over a major portion of the compressive displacement of the material.

2. A compression spring as recited in claim 1 in which said transition means take the shape of at least one cone shaped frustum having approximately the same cross sectional thickness as said spherical segment.

3. A compression spring as recited in claim 1 in which the spring member has been deformed by compression by at least 30% of its length so as to overcome the compression set characteristic of the elastomer, to orient its molecular structure and to provide for the relatively constant spring rate.

4. In a vehicle bumper assembly, a compression spring interconnected between the vehicle and its associated bumper, said spring comprising:
    a) a hollow spring member formed of an elastomer having a molecular structure and a ratio of plastic strain to elastic strain that is greater than 1.5 to 1, the molecular structure of said member being oriented in at least one direction;
    b) said spring member having a spherical segment with ends extending therefrom at an angle, the elastomer forming said spherical segment, said ends and said angle being subject to a compression set for providing for a relatively constant spring rate over a major portion of the compression of said spring.

5. A compression spring as recited in claim 4 in which said spring is formed of one piece for reducing component costs and for minimizing the costs of installation into the bumper assemblies of automobiles, said ends of said spherical segment comprising cone shaped frustums extending at an acute angle from said spherical segment.

6. A preform for a compression spring comprising:
    a) a generally cylindrical body formed of an elastomer having a ratio of plastic strain to elastic strain that is greater than 1.5 to 1;
    b) cone shape frustums extending at an angle from at least one end of said cylindrical body;
    c) attaching means for mounting said compression spring between two structural members, and
    d) the elastomer of said cylindrical body, said cone shape frustums and the angle being subject to a compression set such that the elastomers is transformed into a compression spring.

7. A preform as recite in claim 6 in which said attaching means include flanges integrally joined to said frustums.

8. A compression spring comprising:
    a) a hollow spring member formed of an elastomer material having a ratio of plastic strain to elastic strain that is greater than 1.5 to 1;
    b) said spring member having a spherical segment,
    c) a frustum extending at an angle from at least one end of said spherical segment and having substantially the same cross-sectional thickness of said segment; and
    d) the elastomer material of said segment, said frustum and the angle being subject to a compression set to provide a relatively constant spring rate over a major portion of the compression of said spring.

* * * * *